(12) United States Patent
Schuster et al.

(10) Patent No.: US 10,714,224 B2
(45) Date of Patent: Jul. 14, 2020

(54) METHOD OF PREPARING OF IRRADIATION TARGETS FOR RADIOISOTOPE PRODUCTION AND IRRADIATION TARGET

(71) Applicant: Framatome GmbH, Erlangen (DE)

(72) Inventors: Beatrice Schuster, Pfinztal (DE); Wolfgang Schmid, Schwaig (DE)

(73) Assignee: FRAMATOME GMBH, Erlangen (DE)

( * ) Notice: Subject to any disclaimer, the term of this patent is extended or adjusted under 35 U.S.C. 154(b) by 116 days.

(21) Appl. No.: 15/545,807

(22) PCT Filed: Jan. 29, 2015

(86) PCT No.: PCT/EP2015/051844
§ 371 (c)(1),
(2) Date: Jul. 24, 2017

(87) PCT Pub. No.: WO2016/119864
PCT Pub. Date: Aug. 4, 2016

(65) Prior Publication Data
US 2018/0019032 A1    Jan. 18, 2018

(51) Int. Cl.
*G21G 1/06* (2006.01)
*G21G 1/02* (2006.01)
*H05H 6/00* (2006.01)

(52) U.S. Cl.
CPC ................. *G21G 1/02* (2013.01); *H05H 6/00* (2013.01)

(58) Field of Classification Search
CPC ........................................................ G21G 1/02
USPC ........................................................ 376/184
See application file for complete search history.

(56) References Cited

U.S. PATENT DOCUMENTS

| | | |
|---|---|---|
| 5,900,146 A | 5/1999 | Ballard et al. |
| 6,171,489 B1 | 1/2001 | Ballard et al. |
| 7,858,023 B2 | 12/2010 | Enokido et al. |
| 8,679,998 B2 | 3/2014 | Watanabe et al. |
| 2003/0183991 A1 | 10/2003 | Hideki et al. |
| 2004/0254418 A1* | 12/2004 | Munro, III ............ A61N 5/1002 600/8 |
| 2008/0053273 A1 | 3/2008 | Enokido et al. |
| 2009/0246127 A1 | 10/2009 | Hummel et al. |
| 2013/0223578 A1* | 8/2013 | Russell, II ............... G21G 1/02 376/171 |
| 2017/0196997 A1 | 7/2017 | Sun et al. |

FOREIGN PATENT DOCUMENTS

| | | |
|---|---|---|
| CN | 1159198 A | 9/1997 |
| CN | 1938115 A | 3/2007 |
| CN | 101080241 A | 11/2007 |
| CN | 101284161 A | 10/2008 |
| CN | 101515483 A | 8/2009 |
| CN | 101628811 A | 1/2010 |
| CN | 104043138 A | 9/2014 |
| EP | 1336596 B1 | 8/2003 |
| EP | 2093773 A2 | 8/2009 |
| RU | 2162678 C1 | 2/2001 |

OTHER PUBLICATIONS

PCT International Search Report and Written Opinion dated Sep. 29, 2015 from corresponding Application No. PCT/EP2015/051844, 9 pages.

* cited by examiner

*Primary Examiner* — Marshall P O'Connor
(74) *Attorney, Agent, or Firm* — Dilworth IP, LLC

(57) ABSTRACT

The invention provides a method of preparing irradiation targets for radioisotope production in instrumentation tubes of a nuclear power reactor, the method comprising the steps of: providing a powder consisting of an oxide of a rare earth metal having a purity of greater than 99% and, optionally, an organic binder; pelletizing the powder and optionally the organic binder to form a substantially spherical green body having a diameter of from between 1 to 10 mm; and sintering the spherical green body in solid phase at a temperature of at least 70 percent of a solidus temperature of the rare earth metal oxide powder and for a time sufficient to form a round sintered rare earth metal oxide target having a sintered density of at least 80 percent of the theoretical density.

24 Claims, No Drawings

METHOD OF PREPARING OF IRRADIATION TARGETS FOR RADIOISOTOPE PRODUCTION AND IRRADIATION TARGET

TECHNICAL FIELD OF THE INVENTION

The present invention is directed to a method for preparing irradiation targets used to produce radioisotopes in the instrumentation tubes of a nuclear power reactor, and an irradiation target obtained by this method.

BACKGROUND OF THE INVENTION

Radioisotopes find applications various fields such as industry, research, agriculture and medicine. Artificial radioisotopes are typically produced by exposing a suitable target material to neutron flux in a cyclotron or in a nuclear research reactor for an appropriate time. Irradiation sites in nuclear research reactors are expensive and will become even more scarce in future due to the age-related shut-down of reactors.

EP 2 093 773 A2 is directed to a method of producing radioisotopes using the instrumentation tubes of a commercial nuclear power reactor, the method comprising: choosing at least one irradiation target with a known neutron cross-section; inserting the irradiation target into an instrumentation tube of a nuclear reactor, the instrumentation tube extending into the reactor and having an opening accessible from an exterior of the reactor, to expose the irradiation target to neutron flux encountered in the nuclear reactor when operating, the irradiation target substantially converting to a radioisotope when exposed to a neutron flux encountered in the nuclear reactor, wherein the inserting includes positioning the irradiation target at an axial position in the instrumentation tube for an amount of time corresponding to an amount of time required to convert substantially all the irradiation target to a radioisotope at a flux level corresponding to the axial position based on an axial neutron flux profile of the operating nuclear reactor; and removing the irradiation target and produced radioisotope from the instrumentation tube.

The roughly spherical irradiation targets may be generally hollow and include a liquid, gaseous and/or solid material that converts to a useful gaseous, liquid and/or solid radioisotope. The shell surrounding the target material may have negligible physical changes when exposed to a neutron flux. Alternatively, the irradiation targets may be generally solid and fabricated from a material that converts to a useful radioisotope when exposed to neutron flux present in an operating commercial nuclear reactor.

The neutron flux density in the core of a commercial nuclear reactor is measured, inter alia, by introducing solid spherical probes of a ball measuring system into instrumentation tubes passing through the reactor core using pressurized air for driving the probes. However, up to date there are no appropriate irradiation targets available which have the mechanical and chemical stability required for being inserted into and retrieved from the instrumentation tubes of a ball measuring system, and which are able to withstand the conditions present in the nuclear reactor core.

EP1 336 596 B1 discloses a transparent sintered rare earth metal oxide body represented by the general formula $R_2O_3$ wherein R is at least one element of a group comprising Y, Dy, Ho, Er, Tm, Yb and Lu. The sintered body is prepared by providing a mixture of a binder and a high-purity rare earth metal oxide material powder having a purity of 99.9% or more, and having an Al content of 5-100 wtppm in metal weight and an Si content of 10 wtppm or less in metal weight, to prepare a molding body having a green density of 58% or more of the theoretical density. The binder is eliminated by thermal treatment, and the molding body is sintered in an hydrogen or inert gas atmosphere or in a vacuum at a temperature of between 1450° C. and 1700° C. for 0.5 hour or more. The addition of Al serves as a sintering aid and is carefully controlled so that the sintered body has a mean grain size of between 2 and 20 μm.

U.S. Pat. No. 8,679,998 B2 discloses a corrosion-resistant member for use in a semiconductor manufacturing apparatus. An $Yb_2O_3$ raw material having a purity of at least 99.9% is subjected to uniaxial pressure forming at a pressure of 200 kgf/cm$^2$ (19.6 MPa), so as to obtain a disc-shaped compact having a diameter of about 35 mm and a thickness of about 10 mm. The compact is placed into a graphite mold for firing. Firing is performed using a hot-press method at a temperature of 1800° C. under an Ar atmosphere for at least 4 hours to obtain a corrosion-resistant member for semiconductor manufacturing apparatus. The pressure during firing is 200 kgf/cm$^2$ (19.6 MPa). The $Yb_2O_3$ sintered body has an open porosity of 0.2%.

The above methods generally provide sintered rare earth metal oxide bodies adapted to specific applications such as corrosion-resistance or optical transparency. However, none of the sintered bodies produced by these methods has properties required for irradiation targets used for radioisotope production in commercial nuclear power reactors.

Powder agglomeration techniques are known to a person skilled in the art for producing compacted spherical bodies. The review article of N. Clausen, G. Petzow, "Kugelherstellung durch Pulveragglomeration", Z. f. Werkstofftechnik 3 (1973), pp. 148-156, discloses standard agglomeration methods and the relevant physical parameters. A rotating drum for powder agglomeration is disclosed, for example, in EP 0 887 102 A2.

SUMMARY OF THE INVENTION

It is an object of the present invention to provide appropriate targets which can be used as precursors for the production of predetermined radioisotopes by exposure to the neutron flux in a commercial nuclear power reactor, and which at the same time are able to withstand the specific conditions in a pneumatically operated ball measuring system.

It is a further object of the invention to provide a method for the production of these irradiation targets which is cost effective and suitable for mass production.

According to the invention, this object is solved by a method for the production of irradiation targets according to claim 1.

Preferred embodiments of the invention are given in the sub-claims, which may be freely combined with each other.

The irradiation targets obtained by the method of the present invention have small dimensions adapted for use in commercially existing ball measuring systems, and also fulfill the requirements with respect to pressure resistance, temperature resistance and shear resistance so that they are sufficiently stable when being inserted in a ball measuring system and transported through the reactor core by means of pressurized air. In addition, the targets can be provided with a smooth surface to avoid abrasion of the instrumentation tubes. Moreover, the irradiation targets have a chemical purity which render them useful for radioisotope production.

In particular, the invention provides a method of preparing irradiation targets for radioisotope production in instrumentation tubes of a nuclear power reactor, the method comprising the steps of:

providing a powder consisting of an oxide of a rare earth metal having a purity of greater than 99% and, optionally, an organic binder;

pelletizing the powder and optionally the organic binder to form a substantially spherical green body having a diameter of from between 1 to 10 mm; and sintering the green body in solid phase at a temperature of at least 70 percent of a solidus temperature of the rare earth metal oxide powder and for a time sufficient to form a substantially spherical sintered rare earth metal oxide target having a sintered density of at least 80 percent of the theoretical density.

DETAILED DESCRIPTION OF THE INVENTION

The invention resorts to processes known from the manufacture of sintered ceramics and can therefore be carried out on commercially available equipment, including appropriate pelletizing or granulating devices and sintering facilities. Powder agglomeration also allows for providing targets having a narrow particle size distribution of the pellets (granules) and a substantially spherical shape, which facilitate use in existing instrumentation tubes for ball measuring systems. Thus, the costs for preparing the irradiation targets can be kept low since mass production of suitable radioisotope precursor targets will be possible.

The method is also variable and useful for producing many different targets having the required chemical purity. In addition, the sintered targets are found to be mechanically stable and in particular resistant to transportation within instrumentation tubes using pressurized air even at temperatures of up to 400° C. present in the nuclear reactor core.

According to a preferred embodiment, the oxide is represented by the general formula $R_2O_3$ wherein R is a rare earth metal selected from the group consisting of Nd, Sm, Y, Dy, Ho, Er, Tm, Yb and Lu.

More preferably, the rare earth metal is Sm, Y, Ho, or Yb, preferably Yb-176 which is useful for producing Lu-177, or Yb-168 which can be used to produce Yb-169.

Most preferably, the rare earth metal in the rare earth metal oxide is monoisotopic. This guarantees a high yield of the desired radioisotope and reduces purification efforts and costs.

According to a further preferred embodiment, the powder of the rare earth metal oxide has a purity of greater than 99%, more preferably greater than 99.9%/TREO (TREO=Total Rare Earth Oxide), or even greater than 99.99%. The inventors contemplate that an absence of alumina as an impurity is beneficial to the sinterability of the rare earth metal oxide and the further use of the sintered target as a radioisotope precursor. The inventors also contemplate that neutron capturing impurities such as B, Cd, Gd should be absent.

Preferably, the powder of the rare earth metal oxide has an average grain size in the range of between 5 and 50 µm. The grain size distribution preferably is from d50=10 µm and d100=30 µm to d50=25 µm and d100=50 µm. Oxide powders suitable for powder agglomeration are commercially available from ITM Isotopen Technologie München AG.

Most preferably, the powder is enriched of Yb-176 with a degree of enrichment of >99%.

In a further preferred embodiment, the powder of the rare earth metal oxide is pelletized by agglomerating in a rotating drum or on a pelletizing disc.

More preferably, an organic binder is added to the oxide powder during the pelletizing step, preferably by spraying an aqueous solution of the binder onto the powder. It is also possible to provide a powder mixture of an organic binder and the rare earth metal oxide, and subject the powder mixture to pelletizing by agglomeration in a rotating drum or on a pelletizing disc.

Preferably, the organic binder is an organic polymer, most preferably a polyvinyl alcohol or methylcellulose.

Most preferably, the organic binder is used in an amount so that the green bodies have a binder content of up to 1 weight percent based on the total weight of the pelletized green bodies, preferably a binder content in a range of from 0.5 to 1 weight percent.

The substantially spherical green bodies preferably have a diameter in a range of between 1 to 5 mm, more preferably from 1 to 3 mm. Most preferably, the size of the spherical green bodies is in a range of from 2 to 3 mm.

The term "substantially spherical" means that the body is capable of rolling, but does not necessarily have the form of a perfect sphere.

In a further embodiment, the rare earth metal oxide powder is pelletized by means of powder agglomeration to form the substantially spherical green body without the use of a binder. Thus, the oxide powder to be pelletized consists of the rare earth metal oxide having a purity of greater than 99%, preferably greater than 99.9 percent or greater than 99.99 percent. According to the invention, the rare earth metal oxide powder also does not contain any sintering aids. The inventors found that binders and/or sintering aids typically used for sintering of rare earth metal oxides may be a source of undesired impurities, but that use of these additives is not necessary, or can be reduced to an amount of 1 weight percent or less in the case of the organic binder, for obtaining a sintered rare earth metal oxide target having a sufficient density.

Preferably, the green density of the pelletized green body is at least 30 percent of the theoretical density, more preferably at least 40 percent and still more preferably in a range of from 30 to 50 percent of the theoretical density. The green density is sufficient to facilitate automated processing of the pelletized green body.

Optionally, the spherical green body may be polished to improve its sphericity or roundness.

In the sintering step, the green body is preferably kept at a sintering temperature of between 70 and 80 percent of the solidus temperature of the rare earth metal oxide. More preferably, the sintering temperature is in a range of between 1650 and 1800° C. The inventors found that a sintering temperature in this range is suitable for sintering most rare earth metal oxides to a high sintering density of at least 80 percent, preferably at least 90 percent of the theoretical density.

Preferably, the green body is kept at the sintering temperature and sintered for a time of from 4 to 24 hours, preferably under atmospheric pressure.

According to a preferred embodiment, the green body is sintered in an oxidizing atmosphere such as in a mixture of nitrogen and oxygen, preferably synthetic air.

While less preferred, the green body can also be sintered in a reducing atmosphere such as a mixture consisting of nitrogen and hydrogen.

Prior to sintering, the green bodies containing the organic binder can be subjected to a degreasing step, preferably by keeping the bodies at a temperature of about 800 to 1000° C. for a time sufficient to evaporate or decompose the organic binder. The degreasing step can also be part of the sintering step and be performed when heating the green bodies up to the sintering temperature.

Optionally, the sintered rare earth metal oxide target may be polished or ground to remove superficial residues and improve its surface roughness. This post-sintering treatment may reduce abrasion of the instrumentation tubes by the sintered targets when inserted at high pressure.

In a further aspect, the invention is directed to a sintered target obtained by the above described method, wherein the sintered target is substantially spherical and has a density of at least 80 percent of the theoretical density, and wherein the rare earth metal oxide has a purity of greater than 99%, preferably greater than 99.9 percent or greater than 99.99 percent.

Preferably, the sintered target has a density of at least 90 percent of the theoretical density, and a porosity of less than 10%. The density and therefore porosity can be determined by measuring in a pycnometer.

The average grain size of the sintered target preferably is in the range of between 5 and 50 μm. The inventors found that a grain size in this range is preferable to provide the sintered target with the sufficient hardness and mechanical strength to withstand impact conditions in pneumatically operated ball measuring systems.

Preferably, the sintered target has a diameter in a range of from 1 to 5 mm, preferably 1 to 3 mm. It is understood that sintering involves a shrinkage in the order up to 40%. Thus, the dimensions of the green bodies are chosen so that shrinkage during sintering results in sintered targets having a predetermined diameter for insertion into commercial ball measuring systems.

Preferably, the targets obtained by the method of the present invention are resistant to a pneumatic inlet pressure of 10 bar used in commercial ball measuring systems and an impact velocity of 10 m/s. In addition, as the targets have been subjected to high sintering temperatures, it is understood that the sintered targets are capable to withstand processing temperatures in the order of about 400° C. present in the core of an operating nuclear reactor.

According to a further aspect of the invention, the sintered rare earth metal oxide targets are used for producing one or more radioisotopes in an instrumentation tube of a nuclear power reactor when in energy producing operation. In a method of producing the radioisotopes, the sintered targets are inserted in an instrumentation tube extending into the reactor core by means of pressurized air, preferably at a pressure of about 7 to 30 bar, and are exposed to neutron flux encountered in the nuclear reactor when operating, for a predetermined period of time, so that the sintered target substantially converts to a radioisotope, and removing the sintered target and produced radioisotope from the instrumentation tube.

Preferably, the rare earth metal oxide is ytterbia-176 and the desired radioisotope is Lu-177. After exposure to the neutron flux the sintered targets are dissolved in acid and the Lu-177 is extracted, for example as disclosed in European Patent EP 2 546 839 A1 which is incorporated herein by reference. Lu-177 is a radioisotope having specific applications in cancer therapy and medical imaging.

The construction and method of operation of the invention, together with additional objects and advantages thereof, will be best understood from the following description of specific embodiments.

According to the method of the present invention, a sintered ytterbia target was produced by providing an ytterbia powder, pelletizing the powder in a rotating drum to form a substantially spherical green body, and sintering the green body in solid phase to form a substantially spherical ytterbia target.

The ytterbia powder had a purity of greater than 99%/TREO, with the following specification being used:

| | |
|---|---|
| $Yb_2O_3$/TREO (% min.) | 99.9 |
| TREO (% min.) | 99 |
| Loss On Ignition (% max.) | 1 |

| | % max. |
|---|---|
| Rare Earth Impurities | |
| $Tb_4O_7$/TREO | 0.001 |
| $Dy_2O_3$/TREO | 0.001 |
| $Ho_2O_3$/TREO | 0.001 |
| $Er_2O_3$/TREO | 0.01 |
| $Tm_2O_3$/TREO | 0.01 |
| $Lu_2O_3$/TREO | 0.001 |
| $Y_2O_3$/TREO | 0.001 |
| Non-Rare Earth Impurities | |
| $Fe_2O_3$ | 0.001 |
| $SiO_2$ | 0.01 |
| CaO | 0.01 |
| $Cl^-$ | 0.03 |
| NiO | 0.001 |
| ZnO | 0.001 |
| PbO | 0.001 |

No sintering aids were added to the ytterbia powder.

The ytterbia powder was pelletized in a rotating drum by agglomerating the powder while spraying an aqueous solution of polyvinyl alcohol (5 weight percent PVA) onto the powder. Substantially spherical green bodies having a diameter of about 2.5 mm+/−0.3 mm were formed and harvested from the rotating drum. The green bodies had a density of about 4-5 $cm^3$, corresponding to a green density of about 50 percent of the theoretical density.

The substantially spherical ytterbia green bodies were subjected to a degreasing treatment at about 1000° C. for removing the organic binder, and sintered in solid phase by keeping them at a temperature of about 1700° C. for at least four hours under an atmosphere of synthetic air at atmospheric pressure. The ytterbia green bodies were placed in MgO saggers to avoid uptake of alumina from the sintering furnace.

Sintered ytterbia targets of a substantially spherical shape were obtained having a diameter of about 1.5 to 2 mm and a sintered density of about 7.8 g/$cm^3$, corresponding to about 85 percent of the theoretical density.

Dilatometer tests were conducted on ytterbia green bodies using a heating rate of 5 K/min. The tests show that substantial shrinkage occurs only at temperatures above 1650° C. which was not totally completed at 1700° C. Thus sintering temperatures in the range of between 1700 and 1800° C. are preferred for sintering of ytterbia and other rare earth metal oxides.

In further tests, the sintering atmosphere was varied from an oxidizing atmosphere consisting of synthetic air to a reducing atmosphere consisting of nitrogen and hydrogen. The sintered ytterbia targets obtained from sintering in reducing atmosphere had a dark colour indicating a change in the stoichiometric composition. Accordingly, use of a reducing sintering atmosphere is possible but less preferred.

The mechanical stability of the sintered ytterbia targets was tested by inserting the targets into a laboratory ball measuring system using an inlet pressure of 10 bar and generating an impact velocity of about 10 m/s. The tests showed that the sintered targets did not break under these conditions.

Ytterbia-176 is considered to be useful for producing the radioisotope Lu-177 which has applications in medical imaging and cancer therapy, but which cannot be stored over a long period of time due to its short half-life of about 6.7 days. Yb-176 is converted into Lu-177 according to the following reaction:

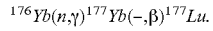

$$^{176}Yb(n,\gamma)^{177}Yb(-,\beta)^{177}Lu.$$

Thus, the sintered targets of ytterbia oxide obtained by the method of the present invention are useful precursors for the production of Lu-177 in the instrumentation tubes of a nuclear reactor during energy producing operation. Similar reactions are known to the person skilled in the art for the production of other radioisotopes from various rare earth oxide precursors.

The invention claimed is:

1. A method for preparing irradiation targets for radioisotope production in instrumentation tubes of a nuclear power reactor, the method comprising the steps of:
providing a powder consisting of an oxide of a rare earth metal having a purity of greater than 99% and, optionally, an organic binder;
agglomerating the powder and the optional organic binder in a rotating drum or on a rotating disc so as to pelletize the powder and the optional organic binder and to form the powder and the optional organic binder into a substantially spherical green body having a diameter of from between 1 to 10 mm, and
sintering the green body in solid phase at a temperature of at least 70 percent of a solidus temperature of the rare earth metal oxide powder and for a time sufficient to form a substantially spherical sintered rare earth metal oxide target having a sintered density of at least 80 percent of the theoretical density.

2. The method of claim 1 wherein the rare earth metal is selected from the group consisting of Nd, Sm, Y, Dy, Ho, Er, Tm, Yb and Lu.

3. The method of claim 2 wherein the rare earth metal is Sm, Y, Ho or Yb.

4. The method of claim 1 wherein the powder of the rare earth metal oxide has a purity of greater than 99.9 percent.

5. The method of claim 1 wherein the rare earth metal is monoisotopic.

6. The method of claim 1 wherein the organic binder is added to the powder before or during the pelletizing of the rare earth metal oxide powder.

7. The method of claim 6 wherein the organic binder is added to the powder during pelletizing by spraying an aqueous solution of the binder onto the powder of the rare earth metal oxide.

8. The method of claim 1 wherein the organic binder is selected from the group consisting of polyvinyl alcohol and methylcellulose.

9. The method of claim 1 wherein the green bodies contain the organic binder in an amount of up to 1 weight percent, based on the total weight of the green bodies.

10. The method of claim 1 wherein the sintering temperature is between 70 and 80 percent of the solidus temperature of the rare earth metal oxide.

11. The method of claim 1 wherein the sintering temperature is in a range of from 1650 to 1800° C.

12. The method of claim 1 wherein the green body is sintered for a time of from 4 to 24 hours.

13. The method of claim 1 wherein the green body is sintered under atmospheric pressure.

14. The method of claim 1 wherein the green body is sintered in an oxidizing atmosphere.

15. The method of claim 1 wherein the green body is sintered in an atmosphere consisting of nitrogen and oxygen.

16. The method of claim 1 wherein the green body is sintered to a density of at least 90 percent of the theoretical density.

17. The method of claim 1 wherein the sintered target has a porosity of less than 10%.

18. The method of claim 1 wherein the sintered target has a diameter in a range of from 1 to 5 mm.

19. A sintered rare earth metal oxide target obtained by the method according to claim 1, wherein the sintered target is substantially spherical and has a density of at least 80 percent of the theoretical density, and wherein the rare earth metal oxide has a purity of greater than 99%.

20. The target of claim 19 wherein the target is resistant to a pneumatic transport pressure of 10 bar and an impact velocity of 10 m/s.

21. A method for producing radioisotopes wherein the sintered rare earth metal oxide target of claim 19 is inserted in an instrumentation tube of a nuclear power reactor and exposed to neutron flux when in energy producing operation.

22. The method according to claim 21 wherein the rare earth metal oxide is ytterbia and the radioisotope is Lu-177.

23. The method of claim 2 wherein the rare earth metal is Yb-176.

24. The method of claim 1 wherein the sintered target has a diameter in a range of from 1 to 3 mm.

* * * * *